United States Patent
Li et al.

(10) Patent No.: US 11,247,414 B2
(45) Date of Patent: Feb. 15, 2022

(54) COMPOSITE TAPE LAYING APPARATUS WITH TRAVEL DISTANCE ADJUSTMENT CAPABILITY

(71) Applicant: INDUSTRIAL TECHNOLOGY RESEARCH INSTITUTE, Hsinchu (TW)

(72) Inventors: Chang-Chou Li, Tainan (TW); Yen Bor Fang, Pingtung County (TW); Shun-Sheng Ko, Kaohsiung (TW); Teng-Yen Wang, Yunlin County (TW); Yang-Cheng Lin, Chiayi (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 12 days.

(21) Appl. No.: 16/660,694

(22) Filed: Oct. 22, 2019

(65) Prior Publication Data
US 2021/0046716 A1 Feb. 18, 2021

(30) Foreign Application Priority Data

Aug. 14, 2019 (TW) .................. 108128969

(51) Int. Cl.
- *B29C 70/38* (2006.01)
- *B65H 35/00* (2006.01)
- *B29C 53/80* (2006.01)

(52) U.S. Cl.
CPC ........ *B29C 70/388* (2013.01); *B29C 53/8016* (2013.01); *B65H 35/0013* (2013.01);
(Continued)

(58) Field of Classification Search
CPC .......... B29C 53/8016; B29C 53/70388; B29C 2793/0027; Y10T 156/1062; Y10T 156/12
See application file for complete search history.

(56) References Cited

U.S. PATENT DOCUMENTS

| | | | |
|---|---|---|---|
| 3,775,219 A | * | 11/1973 | Karlson ................ B29C 70/388 |
| | | | 156/363 |
| 3,810,805 A | | 5/1974 | Goldsworthy et al. |

(Continued)

FOREIGN PATENT DOCUMENTS

| | | |
|---|---|---|
| CN | 200976729 Y | 11/2007 |
| CN | 104044326 A | 9/2014 |

(Continued)

OTHER PUBLICATIONS

Denkena, B. et al., "Thermographic online monitoring system for Automated Fiber Placement processes", Composites Part B: Engineering, vol. 97, pp. 239-243 (Jul. 15, 2016).
(Continued)

*Primary Examiner* — Mark A Osele
*Assistant Examiner* — Christopher C Caillouet
(74) *Attorney, Agent, or Firm* — Maschoff Brennan

(57) ABSTRACT

The disclosure relates to a tape laying apparatus configured to lay prepreg tape to mould surface. The tape laying apparatus includes a tape supply spool, a compaction head, a cutting tool and at least one travel distance adjustment component. The tape supply spool is configured for the prepreg tape to be wound thereon. The compaction head is configured for delivering the prepreg tape to the mould surface from the tape supply spool. The cutting tool is movable along a cutting path. The cutting tool is configured to cut the prepreg tape passing through the cutting path. The at least one travel distance adjustment component is movably located between the cutting path and the compaction head and configured to push the prepreg tape passing through the cutting path so as to increase or decrease a travel distance of the prepreg tape from the cutting path to the compaction head.

10 Claims, 9 Drawing Sheets

(52) U.S. Cl.
CPC . *B29C 2793/0027* (2013.01); *Y10T 156/1062* (2015.01); *Y10T 156/12* (2015.01)

(56) References Cited

U.S. PATENT DOCUMENTS

| | | | |
|---|---|---|---|
| 4,229,243 A * | 10/1980 | Ellinor | B31D 3/0246 |
| | | | 156/269 |
| 4,696,707 A | 9/1987 | Lewis et al. | |
| 4,790,898 A | 12/1988 | Woods | |
| 4,981,545 A | 1/1991 | Shinno et al. | |
| 5,424,025 A * | 6/1995 | Hanschen | B29C 55/06 |
| | | | 264/288.8 |
| 5,431,749 A * | 7/1995 | Messner | B29C 70/545 |
| | | | 156/358 |
| 5,512,126 A * | 4/1996 | Kannabiran | B32B 37/0053 |
| | | | 156/230 |
| 7,063,118 B2 | 6/2006 | Hauber et al. | |
| 7,611,600 B2 | 11/2009 | Tsujimoto et al. | |
| 9,636,903 B2 | 5/2017 | Nishimura | |
| 10,005,268 B2 | 6/2018 | Jeltsch et al. | |
| 2006/0118244 A1 | 6/2006 | Zaballos et al. | |
| 2009/0095426 A1* | 4/2009 | Yoshioka | H01L 21/67132 |
| | | | 156/378 |
| 2011/0011538 A1 | 1/2011 | Hamlyn et al. | |
| 2017/0151766 A1 | 6/2017 | Wang et al. | |
| 2018/0304580 A1 | 10/2018 | Mao et al. | |

FOREIGN PATENT DOCUMENTS

| | | |
|---|---|---|
| CN | 105522788 B | 11/2017 |
| CN | 208020901 U | 10/2018 |
| CN | 208342049 U | 1/2019 |
| CN | 208730410 U | 4/2019 |
| EP | 1 865 536 A2 | 12/2007 |
| TW | 200539357 A | 12/2005 |
| WO | 2013/024504 A1 | 2/2013 |

OTHER PUBLICATIONS

Rousseau, G. et al., "Automated Fiber Placement Path Planning A state-of-the-art review", Computer-Aided Design & Applications, vol. 16, Issue 2, pp. 172-203 (Jan. 2019).

Zacchia, T. et al., "Design of Hard Compaction Rollers for Automated Fiber Placement on Complex Mandrel Geometries", Proceedings of The Canadian Society for Mechanical Engineering International Congress, CSME International Congress 2018, pp. 1-4 (2018).

TW Notice of allowance dated Oct. 7, 2019 as received in Application No. 108128969.

* cited by examiner

COMPOSITE TAPE LAYING APPARATUS WITH TRAVEL DISTANCE ADJUSTMENT CAPABILITY

CROSS-REFERENCE TO RELATED APPLICATIONS

This non-provisional application claims priority under 35 U.S.C. § 119(a) on Patent Application No(s). 108128969 filed in R.O.C. Taiwan on Aug. 14, 2019, the entire contents of which are hereby incorporated by reference.

TECHNICAL FIELD

The disclosure relates to a tape laying apparatus, more particularly to a tape laying apparatus including a travel distance adjustment component.

BACKGROUND

Carbon fiber reinforced polymer (CFRP) has excellent properties, such as lightweight, high structural strength, high heat resistance, high fatigue resistance, high resistance to latent denaturation, high chemical resistance, and small thermal expansion coefficient, thus it is widely used in various industries, such as aerospace, drones, energy, medical biology, vehicles, bicycles, other types of public transportation, sport equipment, and livelihood products, the market of CFRP is greatly increasing in many countries.

Generally, CFRP is a composite material obtained by adding or pre-impregnating a carbon fiber to a substrate, such as resin, where the combination of the carbon fiber and the substrate can be called prepreg tape or prepreg stripe depending its shape. The shape of the prepreg tape is applicable to be laid onto portions of different shapes of products outer surface. Depending on the material of the substrate, the CFRP can be roughly classified into thermoset CFRP and thermoplastic CFRP. Due to insufficient heating technology in years ago, manufacturers were usually using thermoset prepreg tape. However, the thermoset prepreg tape has disadvantages, such as unable to be recycled and requiring to perform autoclave process for solidification and thus increasing manufacturing cost and time.

In recent years, as the development of high-power laser technology progresses, the heating devices now are able to provide a large amount of heat within a very short time period, and which makes the thermoplastic prepreg tape become more practical so that more and more manufacturers start to use thermoplastic prepreg tape. The thermoplastic prepreg tape can be simultaneously laid and heated, thus, in terms of tape laying process, it takes a shorter time to lay the thermoplastic prepreg tape compared to that required by laying thermoset prepreg tape. In addition, the thermoplastic prepreg tape can be recycled and reused, making it more competitive and in line with the trend in reuse.

Usually, during the laying process of the thermoplastic prepreg tape, it has to heat and melt the thermoplastic prepreg tape and then let the thermoplastic prepreg tape to naturally re-solidify, but the surface of the product is gradually covered by the thermoplastic prepreg tape one stripe at a time, thus, besides the heater, the tape laying apparatus requires a cutting tool for cutting the prepreg tape at a desired length. The feeding of the cutting tool at least takes a few seconds to run, thus the conventional tape laying apparatus has to temporarily pause the feeding of the laid prepreg tape for waiting for the feeding of the cutting tool; and as the prepreg tape is cut by the cutting tool, the apparatus then begins to feed the rest part of the current stripe of the prepreg tape. However, during the temporary pause of the prepreg tape, the heating device still continuously provides large amount of heat to the specific portion of the current prepreg tape, resulting in overheating in the prepreg tape and thereby leading to serious issues, such as laying defects and deterioration of laid prepreg tape. More specifically, it takes approximately 2 to 3 seconds for the cutting tool to cut the prepreg tape, the influence that the heating device causes on the prepreg tape will become more serious. For example, in a case that a stripe of prepreg tape in 50-centimeter can be completely laid onto the target surface within 12 seconds if it is not paused, but in fact, the feeding of the cutting tool takes 3 seconds so that the time for laying the whole stripe of prepreg tape is at least increased by 25%. It can be understood that more strips of the prepreg tape waste longer time for waiting for the feeding of the cutting tool.

To avoid the above problems, some try to turn off the heating device while the prepreg tape is paused and waiting for the feeding of the cutting tool, but this will cause uneven heating of the prepreg tape. Some others try to provide extra length per stripe of prepreg tape to let the overheating part of prepreg tape to not fall in the predetermined area of product; however, this approach greatly increases the cost of material. For example, in a case where a 50-centimeter prepreg tape is being fed at a rate of approximately 4 centimeters per second and the feeding of the cutting tool costs approximately 3 seconds, the length of extra prepreg tape per stripe shall be around 12 centimeters, and which means that this approach at least wastes 24% extra material in laying a 50-centimeter prepreg tape. It can be understood that more strips of the prepreg tape waste more of the prepreg tape and cost more time.

Therefore, the conventional tape laying apparatus is not able to provide a quality thermoplastic carbon fiber on product in a cost-effective and efficient manner.

SUMMARY

One embodiment of the disclosure provides a tape laying apparatus configured to lay a prepreg tape onto a mould surface. The tape laying apparatus includes a tape supply spool, a compaction head, a cutting tool and at least one travel distance adjustment component. The tape supply spool is configured for the prepreg tape to be wound thereon. The compaction head is configured for delivering the prepreg tape to the mould surface from the tape supply spool. The cutting tool is movable along a cutting path. The cutting tool is configured to cut the prepreg tape passing through the cutting path. The at least one travel distance adjustment component is movably located between the cutting path and the compaction head and configured to push the prepreg tape passing through the cutting path so as to increase or decrease a travel distance of the prepreg tape from the cutting path to the compaction head.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
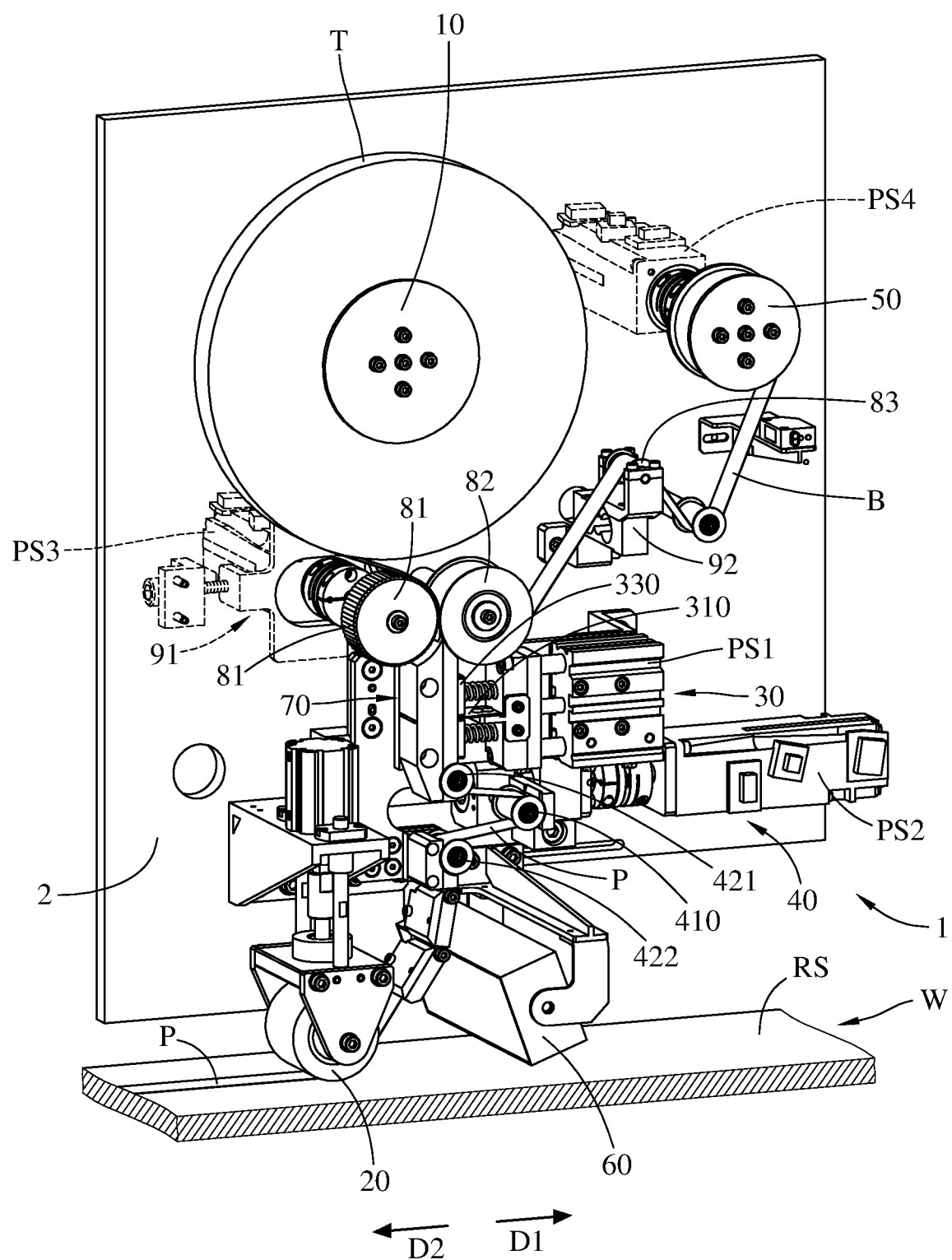
FIG. 1 is a perspective view of a tape laying apparatus according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details.

In addition, for the purpose of simple illustration, well-known structures and devices are drawn schematically, and some components or unnecessary details may be omitted from the drawings. And the size or ratio of the features in the drawings of the present disclosure may be exaggerated for illustrative purposes, but the present disclosure is not limited thereto. Note that the actual size and designs of the product manufactured based on teaching and suggestion of the present disclosure may also be properly modified according to any actual requirement. Furthermore, for ease of understanding, a coordinate system is provided in the drawings, but the disclosure is not limited by the coordinate system.

In addition, terms, such as "part", "portion" or "area" may be used in the following to describe specific element and structure or specific technical feature on or between them, but these elements, structure and technical feature are not limited by these terms. Also, terms, such as "substantially", "approximately" or "about" may be used below; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings.

Firstly, referring to FIG. 1, this embodiment provides a tape laying apparatus 1 configured to place or lay a unidirectional tape T onto either flat or contoured parts, such as a mould surface RS of the workpiece W shown in FIG. 1.

The tape T is, for example, a composite stripe obtained by adding or pre-impregnating a carbon fiber to a substrate, such as resin, where the combination of the carbon fiber and the substrate can be called prepreg tape or pre-impregnated tape P. The carbon fiber used herein may have some excellent properties, such as lightweight, high structural strength, high heat resistance, high fatigue resistance, high resistance to latent denaturation, high chemical resistance, and small thermal expansion coefficient, thus the prepreg tape P can be considered as the well-known carbon fiber reinforced polymer (CFRP). In addition, the prepreg tape P has extensibility and flexibility, thus the prepreg tape P can be perfectly applied along the mould surface RS. Note that the disclosure is not limited by the prepreg tape P and its composition.

In addition, depending on the material of the resin, such as thermoset resin or thermoplastic resin, the prepreg tape P can be roughly classified into thermoplastic prepreg tape and thermoset prepreg tape. The thermoset prepreg tape has disadvantages, such as unable to be recycled and requiring to perform autoclave process for solidification and thus increasing manufacturing cost and time. In contrast, the thermoplastic prepreg tape can be simultaneously laid and heated, thus laying the thermoplastic prepreg tape takes a shorter time compared to laying the thermoset prepreg tape. In addition, the thermoplastic prepreg tape can be recycled and reused, making it more competitive and in line with the trend in reuse. However, in this disclosure, the prepreg tape P is not limited to be thermoset or thermoplastic.

The tape laying apparatus 1 includes a heating device configured to heat the prepreg tape P. In this embodiment or some other embodiments, the heating device 60 uses, for example, but not limited to laser, infrared ray, halogen light, gas flame or hot airflow as its heat source. In some embodiments, the heating device 60 is, for example, but not limited to a vertical-cavity surface emitting lasers (VCSEL). To the prepreg tape P of the exemplary embodiments of the disclosure, the heating device 60 is able to heat the substrate (e.g., resin) of the prepreg tape P up to around 300 degrees Celsius in a very short time period (e.g., around 200 milliseconds). Note that the disclosure is not limited to the type of the heating device 60, and how much the temperature is required to be raised in the heated area of the prepreg tape P either is not particularly restricted. And the power or type of the heating device 60 all can be changed depending on the property of the prepreg tape P. In addition, in this embodiment or some other embodiments, the heating device 60 may be movable so that the range and position of the heated area all can be adjusted.

In this embodiment or some other embodiments, the tape T may further include a backing layer B. The backing layer B is removably attached onto a side of the prepreg tape P and is used to avoid the prepreg tape P from becoming self-adhesive due to rise of temperature, but the disclosure is not limited to the material of the backing layer B. Further, the backing layer B is optional; in some other embodiments, the tape T may not have the backing layer B; in such a case, the tape T is the prepreg tape P.

As discussed, the heating device 60 will generate large heat energy to a specific part of the prepreg tape P in a very short time period, thus, during the tape laying process of the prepreg tape P to the mould surface RS, any short pause of the prepreg tape P will cause overheating on the heated area of the prepreg tape P and thereby leading to serious issues, such as laying defects and deterioration of laid prepreg tape. The tape laying apparatus 1 is able to avoid such issue from happening.

Figure 2:
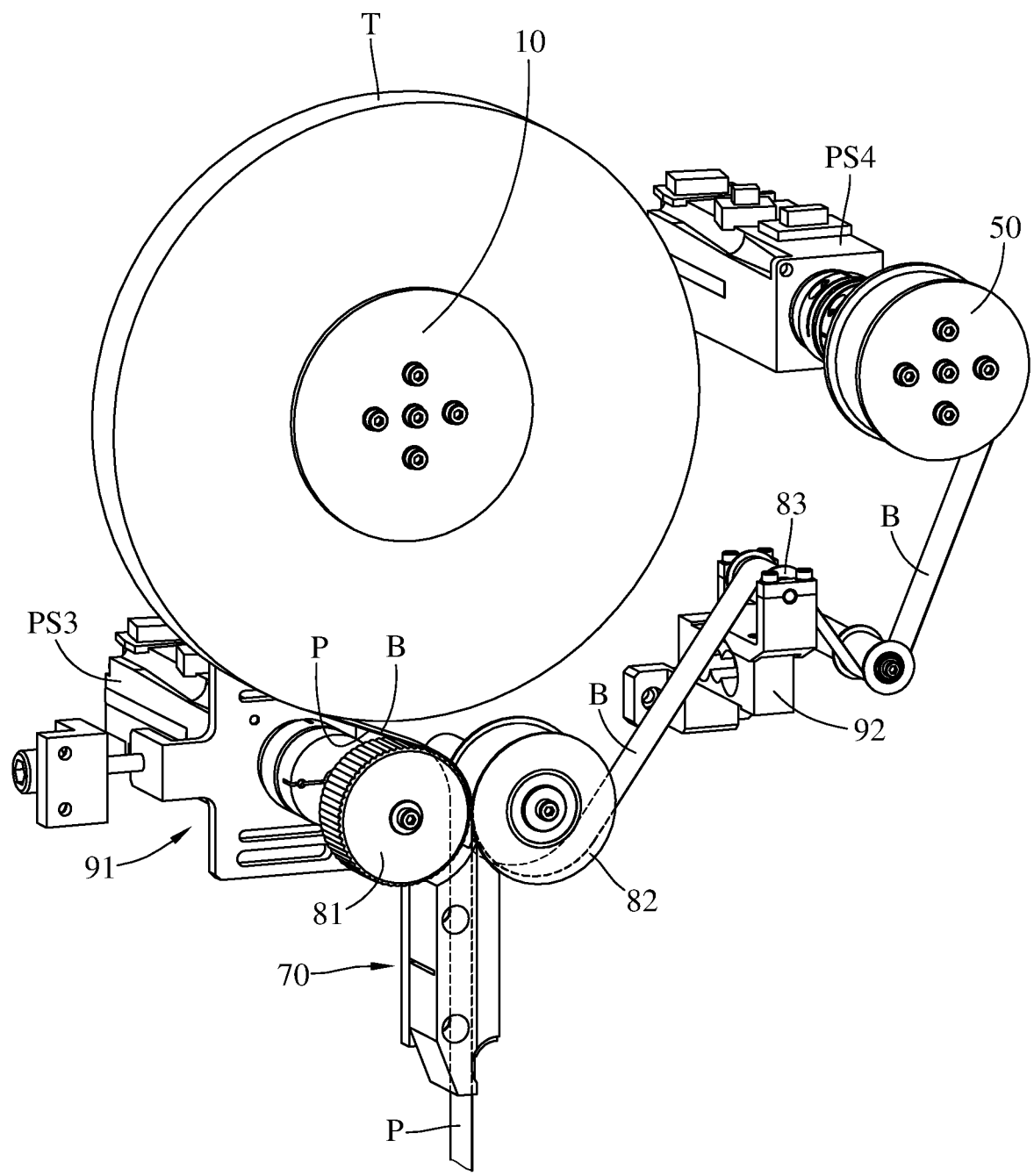
FIGS. 2-4 show partial enlarged views of different parts of the tape laying apparatus in FIG. 1.
Figure 3:
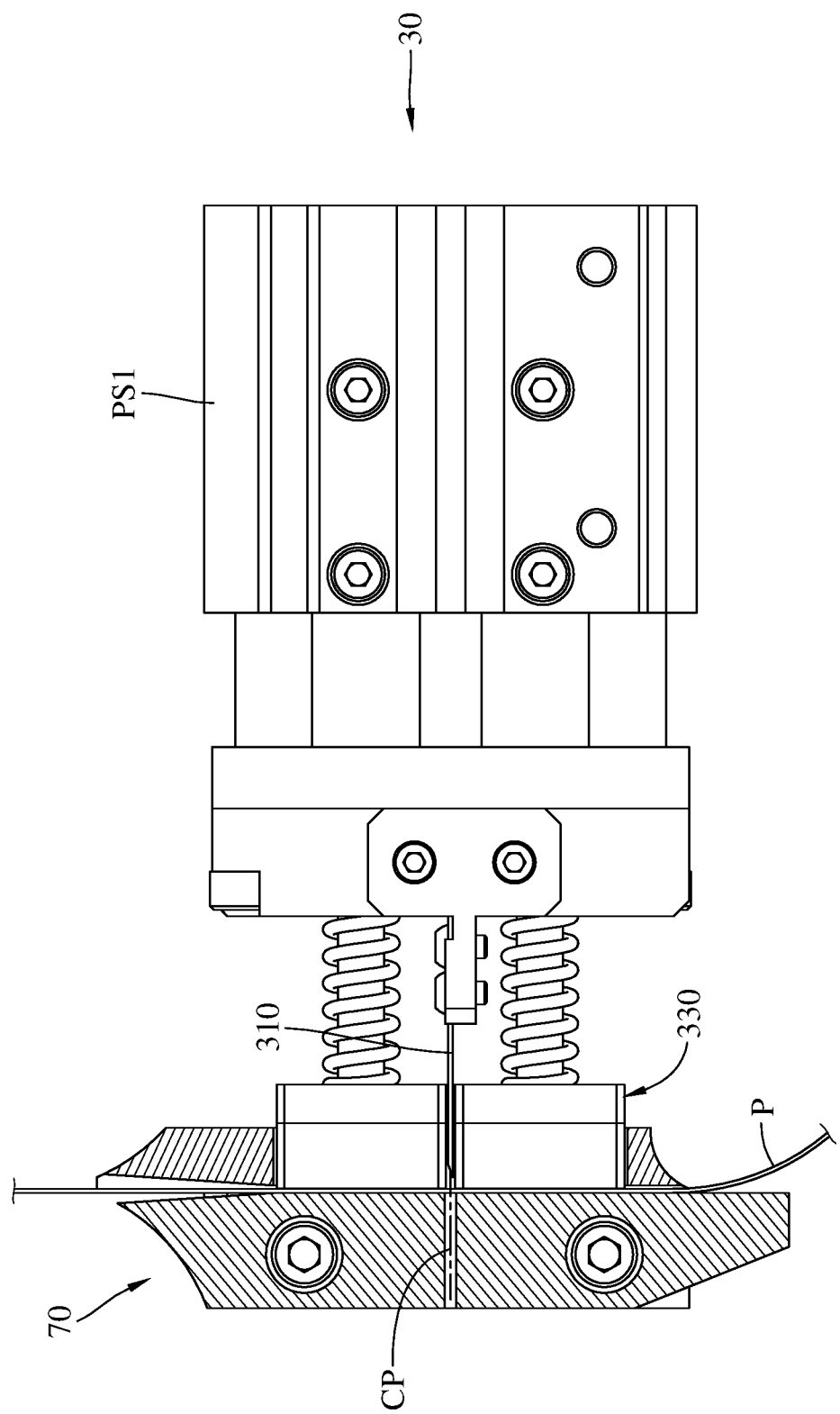
Figure 4:
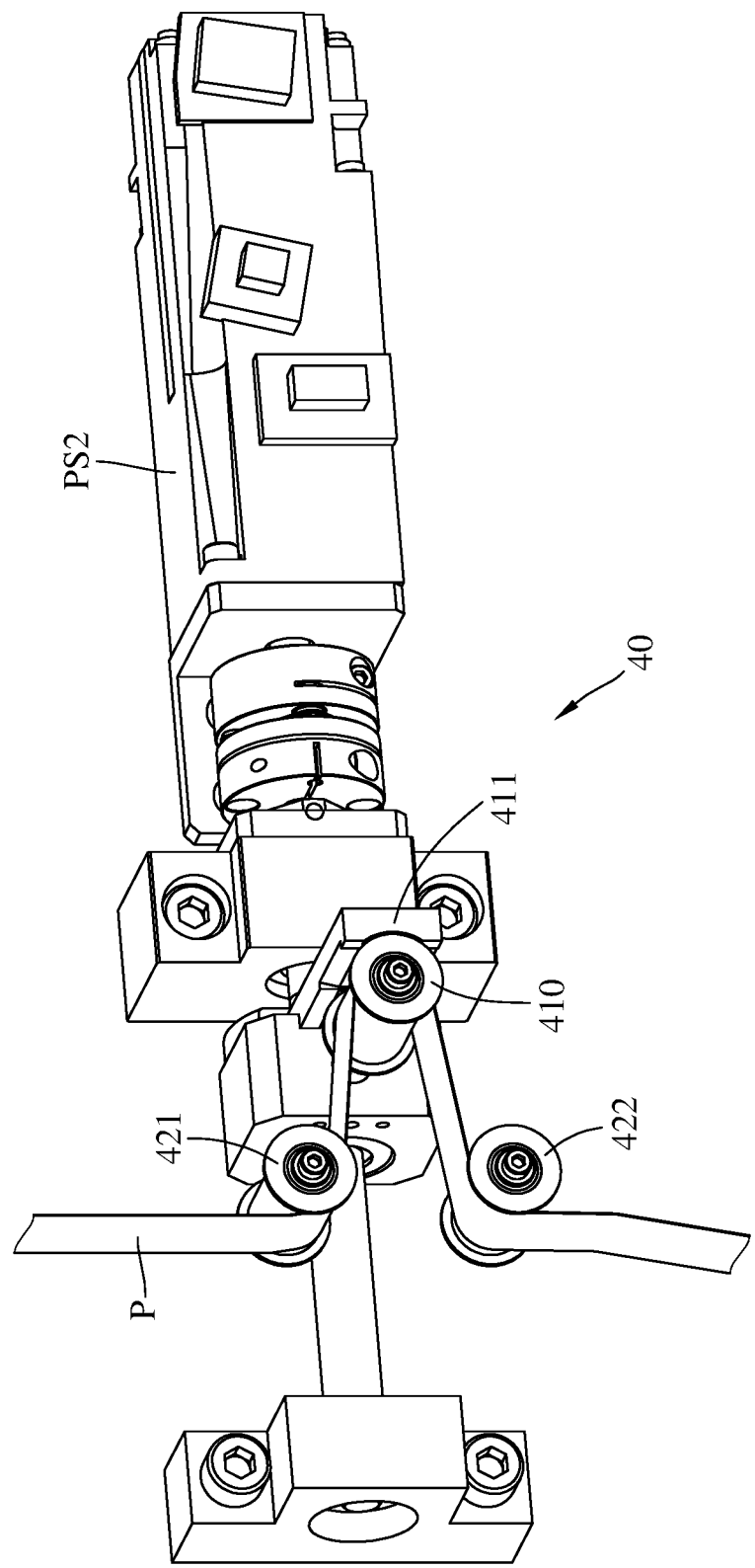

In detail, referring to FIG. 1 and further referring to FIGS. 2-4, where FIGS. 2-4 show partial enlarged views of different parts of the tape laying apparatus 1.

In this embodiment and some other embodiments, the tape laying apparatus 1 includes a tape supply spool 10, a compaction head 20, a cutting tool 310 and a travel distance adjustment component 410. The tape supply spool 10, the compaction head 20, the cutting tool 310 and the travel distance adjustment component 410 are disposed on, for example, a supporting mechanism 2. The supporting mechanism 2 indicates the part of the tape laying apparatus 1 for the installations of the aforementioned or other components of the tape laying apparatus 1. The supporting mechanism 2 and the mould surface RS of the workpiece W can be moved relative to each other so that the tape laying apparatus 1 is able to be moved relative to the mould surface RS of the workpiece W. That is, at least one of the supporting mechanism 2 and the workpiece W is movable, but the disclosure is not limited thereto.

The tape T is wound on the tape supply spool 10; that is, the prepreg tape P and the backing layer B are both wound on the tape supply spool 10, but the disclosure is not limited to the design of the tape supply spool 10 and the length of the tape T wound on the tape supply spool 10.

The compaction head 20 is movable toward or away from the mould surface RS of the workpiece W, but the disclosure is not limited thereto. In some embodiments, the compaction head 20 may be stationary; in such a case, the distance between the compaction head 20 and the mould surface RS can be changed by moving the tape laying apparatus 1 or moving the workpiece W. In this embodiment or some other embodiments, the compaction head 20 is, for example, in a form of roller, and the compaction head 20 is able to press the prepreg tape P against the mould surface RS so as to lay the prepreg tape P onto the mould surface RS while the tape laying apparatus 1 and the mould surface RS of the workpiece W are moving relative to each other. As shown in FIG. 1, during the relative movement of the compaction head 20 and the mould surface RS, the compaction head 20 is moved in a first direction D1 relative to the mould surface RS (or, the mould surface RS is moved in a second direction D2 opposite to the first direction D1 relative to the compaction head 20), such that the compaction head 20 is able to continuously lay the prepreg tape P of the tape T onto the mould surface RS. However, the disclosure is not limited to the design of the compaction head 20, any suitable means that can continuously pull the prepreg tape P to the target surface can be employed as the compaction head of the disclosure; in some embodiments, the compaction head may be a non-rotatable piece.

The cutting tool 30 is movably located on the path of the prepreg tape P between the tape supply spool 10 and the compaction head 20. More specifically, as shown in FIG. 3, the cutting tool 30 is movable along a cutting path CP for cutting the prepreg tape P passing through the cutting path CP, where the cutting path CP is located between the tape supply spool 10 and the compaction head 20; in other words, the part of the prepreg tape P located between the tape supply spool 10 and the compaction head 20 can be cut into two by the cutting tool 30.

In this embodiment or some other embodiments, the tape laying apparatus 1 further includes a first power source PS1. The first power source PS1 is, for example, a cylinder. The cutting tool 30 is disposed on the first power source PS1 and is movable along the cutting path CP by being driven by the first power source PS1.

In this embodiment or some other embodiments, the tape laying apparatus 1 further includes a press component 330 and a guide structure 70. The guide structure 70 is located between the tape supply spool 10 and the compaction head 20 and is configured to guide the prepreg tape P. The guide structure 70 has a slit (not labeled) allowing the cutting tool 30 to pass through to cut the prepreg tape P passing through the guide structure 70; in other words, the cutting path CP of the cutting tool 30 passes through the guide structure 70, but the disclosure is not limited to the guide structure 70 and its design.

The press component 330 is retractably disposed on the first power source PS1 and can be moved toward or away from the guide structure 70 by being driven by the first power source PS1. In this embodiment, the first power source PS1 can drive the press component 330 to move toward the guide structure 70 to press against the prepreg tape P passing through the guide structure 70 and thereby temporarily fixing the prepreg tape P in a proper position before the cutting tool 30 cuts the prepreg tape P. This helps the prepreg tape P to be cut by the cutting tool 30. Note that the part of the press component 330 used to be in contact with the prepreg tape P is, for example, made of a material that is soft or flexible in texture yet has a certain degree of friction coefficient, such as polyurethane (PU), but the disclosure is not limited thereto.

In this embodiment, each press component 330 is sleeved with a compression spring (not labeled), while the press component 330 is being moved toward the guide structure 70 to press against the prepreg tape P by the first power source PS1, part of the press component 330 is retracted into the first power source PS1, such that the compression springs on the press components 330 are compressed and store elastic potential energy. As the press component 330 firstly contacts the prepreg tape P, the cutting tool 30 does not yet reach the prepreg tape P, at this moment, the press component 330 is merely to temporarily fix the prepreg tape P in a proper position. Then, the first power source PS1 moves the cutting tool 30 to pass through the guide structure 70 and cut the prepreg tape P. Then, the first power source PS1 moves the cutting tool 30 out of the guide structure 70 and moves the press component 330 away from the guide structure 70, during this process, the cutting tool 30 is moved away from the pathway of the prepreg tape P along the cutting path CP, and the elastic potential energy stored in the compression spring is released to spring the press component 330 back to its original position for later use.

As such, the cutting tool 30, the first power source PS1, and the press component 330 can be considered as a cutting mechanism 30 for cutting the prepreg tape P. Note that the press component 330 is optional; for example, in some other embodiments, the cutting mechanism may not have the press component 330. In addition, the guide structure 70 is optional as well; for example, in some other embodiments, the tape laying apparatus may not have the guide structure 70.

Figure 5:
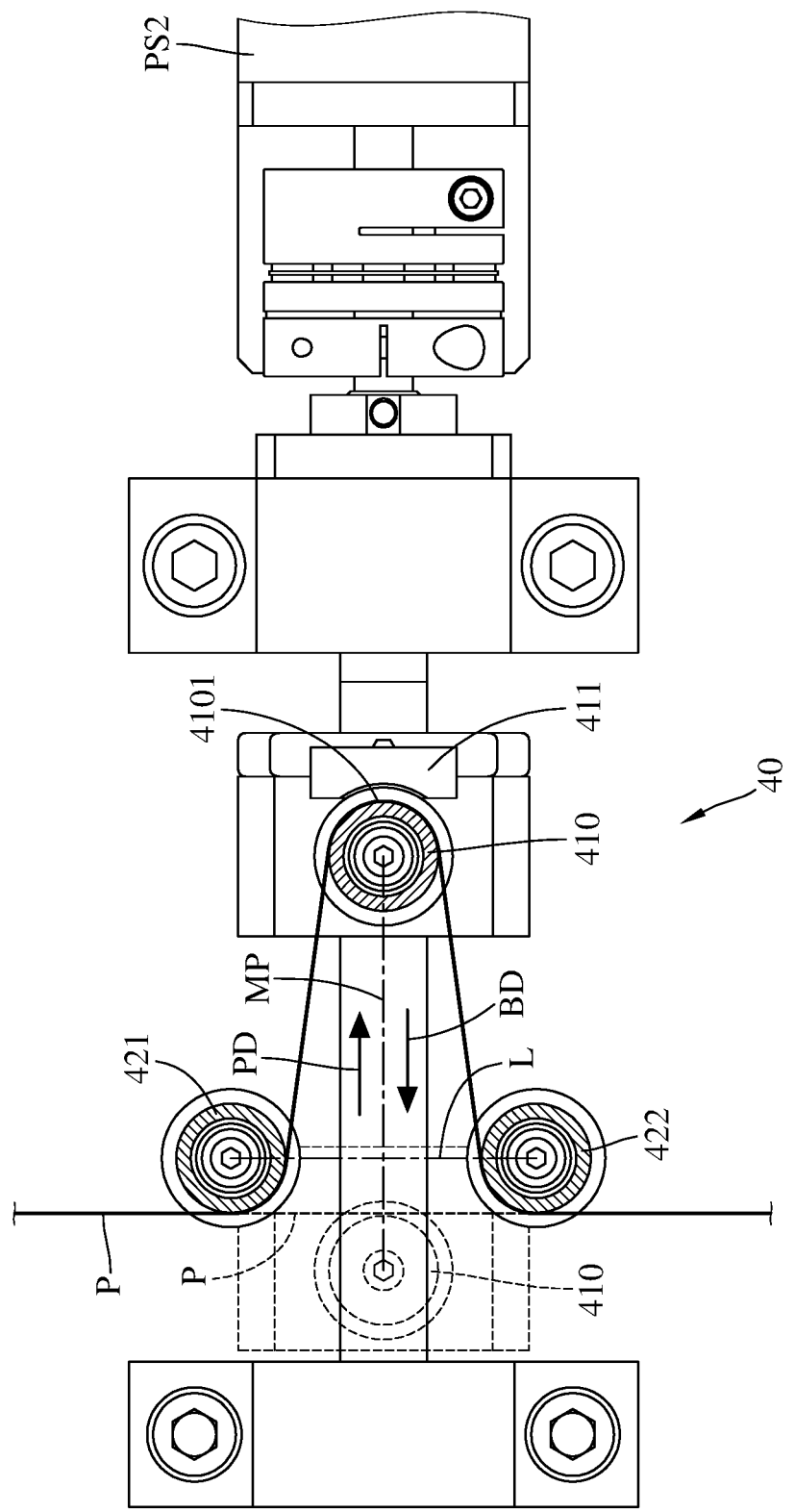
FIG. 5 is a planar view of a travel distance adjustment mechanism of the tape laying apparatus in FIG. 1.

Note that the feeding of the cutting tool 30 takes seconds to complete. To avoid the problems resulted from pausing the feeding of the prepreg tape for waiting for the feeding of the cutting tool, the tape laying apparatus 1 provides the travel distance adjustment component 410 between the cutting path CP and the compaction head 20. More specifically, as shown in FIGS. 4-5, the travel distance adjustment component 410 is movable to pass through the pathway of the prepreg tape P between the cutting path CP and the compaction head 20. In this embodiment, the travel distance adjustment component 410 is, but not limited to a rotatable or nonrotatable object. The travel distance adjustment component 410 is movable along a movement path MP. In detail, the travel distance adjustment component 410 has a tape pushing portion 4101, where the tape pushing portion 4101 is the part of the travel distance adjustment component 410 configured for contacting and pushing the prepreg tape P, and the tape pushing portion 4101 is also movable on the movement path MP.

In this embodiment, the movement path MP of the tape pushing portion 4101 is, but not limited to a straight path. During the movement of the tape pushing portion 4101 of the travel distance adjustment component 410 along the movement path MP in, for example, a tape-pushing direction PD, the tape pushing portion 4101 can contact and push the part of the prepreg tape P located between the cutting path CP and the compaction head 20 so as to increase the travel distance of the prepreg tape P from the cutting path CP to the compaction head 20. In other words, when the part of the prepreg tape P located between the cutting path CP and the compaction head 20 is deformed by the tape pushing portion 4101 of the travel distance adjustment component 410, the pathway or length of the part of the prepreg tape P between the cutting path CP and the compaction head 20 is increased.

In more detail, in this embodiment or some other embodiments, the tape laying apparatus 1 further includes a first guide component 421, a second guide component 422, and a second power source PS2. The second power source PS2 is, for example, a servo motor. The travel distance adjustment component 410 is disposed on, for example, a mount (not labeled) slidably disposed on a ball screw (not labeled) which can be driven by the second power source PS2. Therefore, the second power source PS2 is able to make the travel distance adjustment component 410 move slidably by rotating the ball screw. In short, the travel distance adjustment component 410 can be moved toward to or away from the part of the prepreg tape P that is located between the cutting path CP and the compaction head 20 along the movement path MP by being driven by the second power source PS2. The first guide component 421 and the second guide component 422 are respectively located at two opposite sides of the movement path MP of the travel distance adjustment component 410; that is, the movement path MP of the travel distance adjustment component 410 is located between the first guide component 421 and the second guide component 422. The first guide component 421 and/or the second guide component 422 is, but not limited to a rotatable roller or non-rotatable roller, and the first guide component 421 and the second guide component 422 are able to guide the movement of the prepreg tape P. More specifically, in this embodiment and some other embodiments, the movement path MP of the travel distance adjustment component 410 is not parallel to a line L passing through the first guide component 421 and the second guide component 422. Note that the movement path MP of the travel distance adjustment component 410 is not restricted to have an acute, right, or obtuse angle to the line L, and such angle can be modified or changed according to actual requirements.

In addition, in this embodiment, the tape laying apparatus 1 further includes a guide plate 411. The guide plate 411 is disposed at a side of the travel distance adjustment component 410. The guide plate 411 is configured to guide the prepreg tape P while the travel distance adjustment component 410 is contacting and pushing the prepreg tape P.

Furthermore, in this embodiment or some other embodiments, there is a load gauge (not shown) disposed at another side of the travel distance adjustment component 410 for measuring the force that the travel distance adjustment component 410 pushes the prepreg tape P, and the measurement result would be taken as a reference for controlling the second power source PS2 to adjust the position of the travel distance adjustment component 410, thereby preventing the travel distance adjustment component 410 from making the prepreg tape P too tight or too loose. However, the load gauge is optional, and the disclosure is not limited thereto.

As discussed above, the travel distance adjustment component 410, the guide plate 411, the first guide component 421, the second guide component 422, and the second power source PS2 can together form a travel distance adjustment mechanism 40 to achieve the purpose of adjusting or changing the travel distance of the prepreg tape P. The operation of the travel distance adjustment component 410 and the timing of using it will be described in the later paragraphs. In addition, note that the first guide component 421 and the second guide component 422 may also be optional; for example, in some other embodiments, the travel distance adjustment mechanism may not include the first guide component 421 and the second guide component 422. Further, the guide plate 411 may be optional; for example, in some other embodiments, the travel distance adjustment mechanism may not include the guide plate 411.

In addition, in this embodiment or some other embodiments, the tape laying apparatus 1 includes a take-up spool 50 for collecting the backing layer B peeled from the prepreg tape P. During the operation, the backing layer B will be continuously wound onto the take-up spool 50. However, the disclosure is not limited to the design of the take-up spool 50 and how much of the backing layer B that the take-up spool 50 can collect.

Further, in this embodiment or some other embodiments, the tape laying apparatus 1 further includes a motor-driven roller 81, an idler roller 82, a third power source PS3, and a fourth power source PS4. The third power source PS3 is, for example, a servo motor. The motor-driven roller 81 is disposed on the third power source PS3 and can be rotated by being driven by the third power source PS3. The motor-driven roller 81 is located at, for example, a side of the tape supply spool 10 so as to continuously feed the prepreg tape P toward a predetermined direction from the tape T wound on the tape supply spool 10. In more detail, the surface of the motor-driven roller 81 is, for example, made of a material that is soft or flexible in texture yet has a certain degree of friction coefficient, such as polyurethane (PU), but the disclosure is not limited thereto. The idler roller 82 is located adjacent to the motor-driven roller 81. When the motor-driven roller 81 drives the tape T to pass through the gap between the motor-driven roller 81 and the idler roller 82, the motor-driven roller 81 is able to move the tape T so as to force the idler roller 82 to be rotated in a direction opposite to that of the motor-driven roller 81. As such, the idler roller 82 is able to remove the backing layer B from the tape T and guide it toward the take-up spool 50. The fourth power source PS4 is, for example, a servo motor. The take-up spool 50 is disposed on the fourth power source PS4 and can be rotated by being driven by the fourth power source PS4 so as to continuously collect the backing layer B from the idler roller 82. The fourth power source PS4 is able to provide a proper tension to the backing layer B to prevent the backing layer B from becoming loose.

Note that the take-up spool 50, the motor-driven roller 81, the idler roller 82, the third power source PS3, and the fourth power source PS4 are all optional. For example, in some embodiments, the tape laying apparatus may not include the motor-driven roller 81, the idler roller 82, the third power source PS3, and the fourth power source PS4; in such a case, the prepreg tape P still can be fed to the desired direction by being pulled by the compaction head 20 as the compaction head 20 presses the prepreg tape P against the mould surface RS and moves relative to the mould surface RS, and the collecting process of the backing layer B can still be performed by external collecting device.

In addition, in this embodiment or some other embodiments, the tape laying apparatus 1 further includes a tension roller 83, a first linear moveable bracket 91, and a second linear moveable bracket 92. The first linear moveable bracket 91 is slidably disposed on the supporting mechanism 2, and the motor-driven roller 81 and the third power source PS3 are disposed on the first linear moveable bracket 91 so that the motor-driven roller 81 and the third power source PS3 are able to be moved with the first linear moveable bracket 91, thus at least the motor-driven roller 81 can be moved toward or away from the idler roller 82 so as to slightly adjust the gap between the motor-driven roller 81 and the idler roller 82. In addition, in this embodiment or some other embodiments, there may be a load gauge (not shown) in contact with the side of the motor-driven roller 81 opposite to the prepreg tape P for measuring the force that the motor-driven roller 81 applies to the prepreg tape P, and the measurement result can be taken as a reference for adjusting the position of the motor-driven roller 81. However, this load gauge is optional, and the disclosure is not limited thereto.

The second linear moveable bracket 92 is slidably disposed on the supporting mechanism 2. The tension roller 83 is disposed on the second linear moveable bracket 92 so that the tension roller 83 is able to be moved with the second linear moveable bracket 92, thus the tension roller 83 can be moved toward or away from the backing layer B so as to adjust the tension of the backing layer B between the idler roller 82 and the take-up spool 50. In addition, in this embodiment or some other embodiments, there is a load gauge (not shown) in contact with the side of the tension roller 83 opposite to the backing layer B for measuring the force that the tension roller 83 applies to the backing layer B, and the measurement result can be taken as a reference for adjusting the position of the tension roller 83. However, this load gauge is optional, and the disclosure is not limited thereto.

In addition, the first linear moveable bracket 91 and the second linear moveable bracket 92 are optional. For example, in some embodiments, the tape laying apparatus may not include the first linear moveable bracket 91 and the second linear moveable bracket 92.

Figure 6:
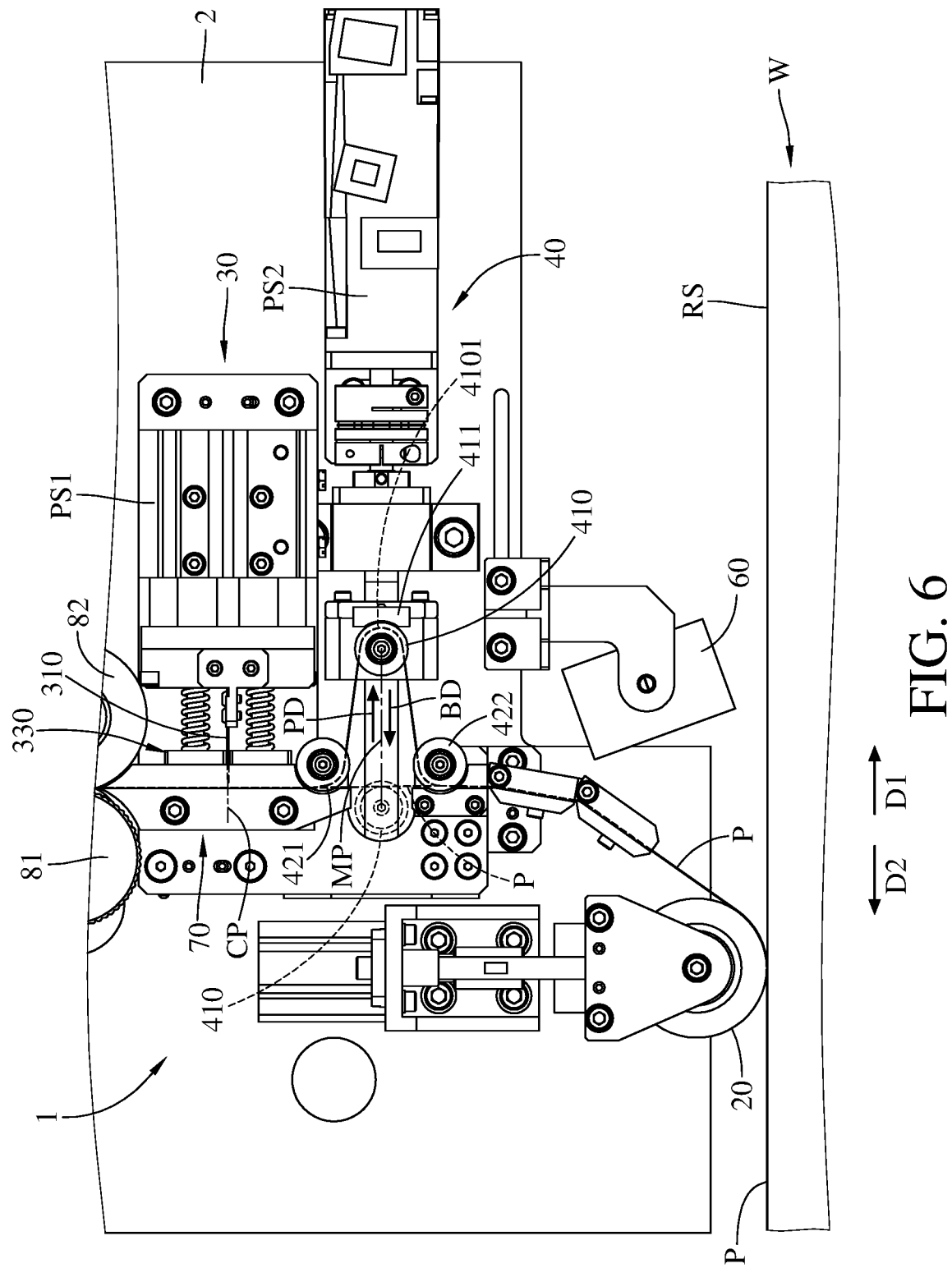
FIG. 6 shows the operation of part of the tape laying apparatus in FIG. 1.

Then, referring to FIG. 6 for introducing the operation and the purpose of the travel distance adjustment component 410, where FIG. 6 shows the operation of part of the tape laying apparatus in FIG. 1.

Firstly, as discussed above, the compaction head 20 presses the prepreg tape P against the mould surface RS of the workpiece W, the relative movement between the compaction head 20 and the mould surface RS begins, and the motor-driven roller 81 continuously pulls the prepreg tape P out of the tape supply spool 10, such that more and more of the prepreg tape P is laid onto the mould surface RS, meanwhile, the heating device 60 keeps heating a specific area where the prepreg tape P is passing through.

In the time period after the compaction head 20 presses the current stripe of the prepreg tape P against the mould surface RS and before the cutting tool 30 contacts and cuts the prepreg tape P, the tape pushing portion 4101 of the travel distance adjustment component 410 is moved along the movement path MP (e.g., in a tape-pushing direction PD) to push and deform the part of the prepreg tape P which is located between the cutting path CP of the cutting tool 30 and the compaction head 20, thereby increasing the travel distance of the prepreg tape P from the cutting path CP to the compaction head 20. As shown in the figure, the prepreg tape P in solid line shows that the part of the prepreg tape P has been deformed by the travel distance adjustment component 410; in contrast, the prepreg tape P in dotted line shows that the part of the prepreg tape P is not yet touched by the travel distance adjustment component 410. This comparison clearly shows that, between the cutting path CP and the compaction head 20, the travel distance of the prepreg tape P in solid line is longer than that of the prepreg tape P in dotted line. As such, the travel distance adjustment component 410 is able to change the pathway of the prepreg tape P so as to increase the travel distance of the prepreg tape P from the cutting path CP to the compaction head 20.

Therefore, during the feeding of the cutting tool 30, the travel distance adjustment component 410 is withdrawn along the movement path MP (e.g., in a withdrawal direction BD) to decrease the amount of the deformation of the part of the prepreg tape P between the cutting path CP and the compaction head 20; by doing so, the part of the prepreg tape P, that was located between the cutting path CP and the compaction head 20 and was deformed by the travel distance adjustment component 410, is released toward the compaction head 20, such that the feeding of the cutting tool 30 does not affect the tape laying process of the prepreg tape P. As such, the increased travel distance of the prepreg tape P between the cutting path CP and the compaction head 20 can be taken as a compensation during the feeding the cutting tool 30, so there is no need to pause the relative movement between the compaction head 20 and the mould surface RS during the feeding of the cutting tool 30 along the cutting path CP; that is, there is no need to pause the feeding of the prepreg tape P for waiting for the feeding of the cutting tool 30. In other words, the travel distance adjustment component 410 is able to temporarily store an extra length of prepreg tape P between the cutting path CP and the compaction head 20 and release it during the feeding of the cutting tool 30, such that the laying of each stripe of prepreg tape P has no need to be paused for waiting for the feeding of the cutting tool 30, thus the conventional problem that the prepreg tape is overheated due to temporarily pause of the prepreg tape is avoided.

It is understood that the distance of the movement path MP of the travel distance adjustment component 410 relates to the amount that the travel distance adjustment component 410 deforms the prepreg tape P; that is, the movement path MP relates to the amount of the length of prepreg tape P that can be created between the cutting path CP and the compaction head 20 before being cut. The distance of the movement path MP of the travel distance adjustment component 410 is adjustable according to, for example, the time that the feeding of the cutting tool 30 requires, the speed of feeding the prepreg tape P or other factors, but the disclosure is not limited thereto. Thus, the disclosure is not limited to the distance of the movement path MP, the distance of the cutting path CP, and the amount that the travel distance adjustment component 410 is able to push or deform the prepreg tape P.

In addition, before the feeding of the cutting tool 30, it is optionally to hold the prepreg tape P by the press component 330. This step is advantageous for the cutting tool 30 to cut the prepreg tape P.

Comparing to that the conventional tape laying apparatus has to temporarily pauses the prepreg tape P for approximately 2 to 3 seconds for waiting for the feeding of the cutting tool, the tape laying apparatus 1 of the disclosure does not need to pause the feeding of the prepreg tape so that the time spent in the tape laying process is largely reduced. In addition, comparing to that some other conventional tape laying apparatus provide extra length per stripe of prepreg tape to let the overheating part of prepreg tape to not fall in the predetermined area, the tape laying apparatus 1 of the disclosure has no need to do so, such that the manufacturing cost and time are largely reduced.

The above travel distance adjustment component is an exemplary embodiment of the disclosure, and the disclosure is not limited thereto. It is understood that, based on the spirit of the disclosure, any other suitable means, that can push and deform the prepreg tape to change the travel distance of the prepreg tape between the cutting path and the compaction head, all can be employed as the travel distance adjustment component of the disclosure. For example, referring to FIG. 7, where FIG. 7 shows the operation of a travel distance adjustment component 40a; and it is noted that, for convenience of description and clarity, the following paragraphs only describe the main differences between the following embodiments and the previous embodiments, and the descriptions for the same or similar features will not be repeated hereinafter.

Figure 7:
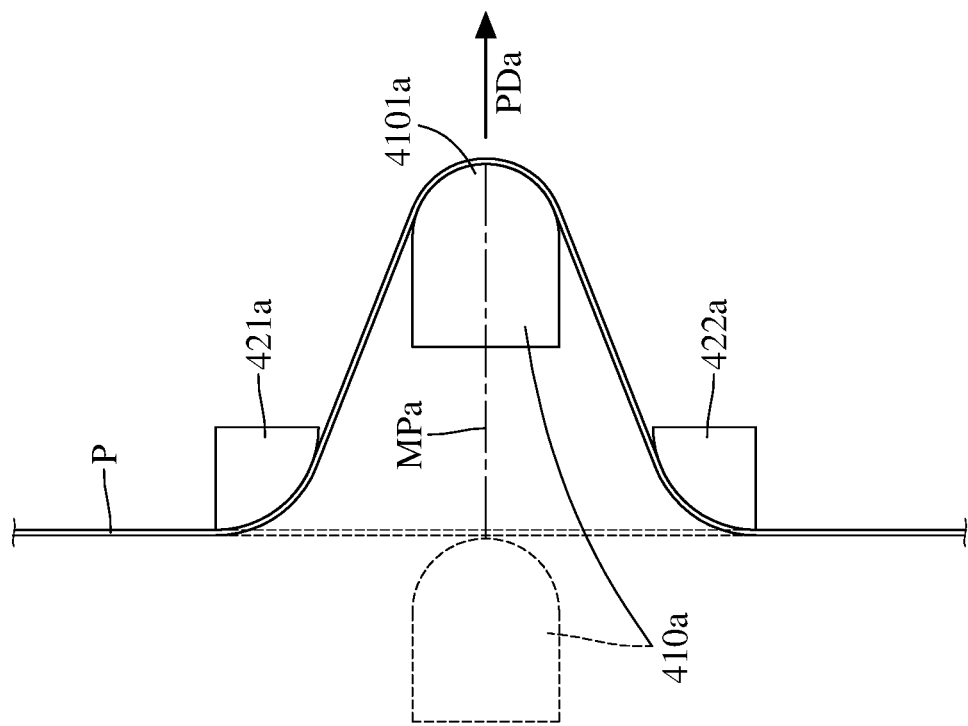
FIG. 7 shows the operation of a travel distance adjustment component according to another embodiment of the disclosure.

As shown in FIG. 7, a tape pushing portion 4101a of the travel distance adjustment component 410a is in a curved shape, and a first guide component 421b and a second guide component 422b respectively located at two opposites sides of a movement path MPa of the travel distance adjustment component 410a may be parts of the periphery components. Therefore, when the travel distance adjustment component 410a is moved in a tape-pushing direction PDa along the movement path MPa to deform the prepreg tape P, the tape pushing portion 4101a is in a shape that can guide the prepreg tape P.

Figure 8:
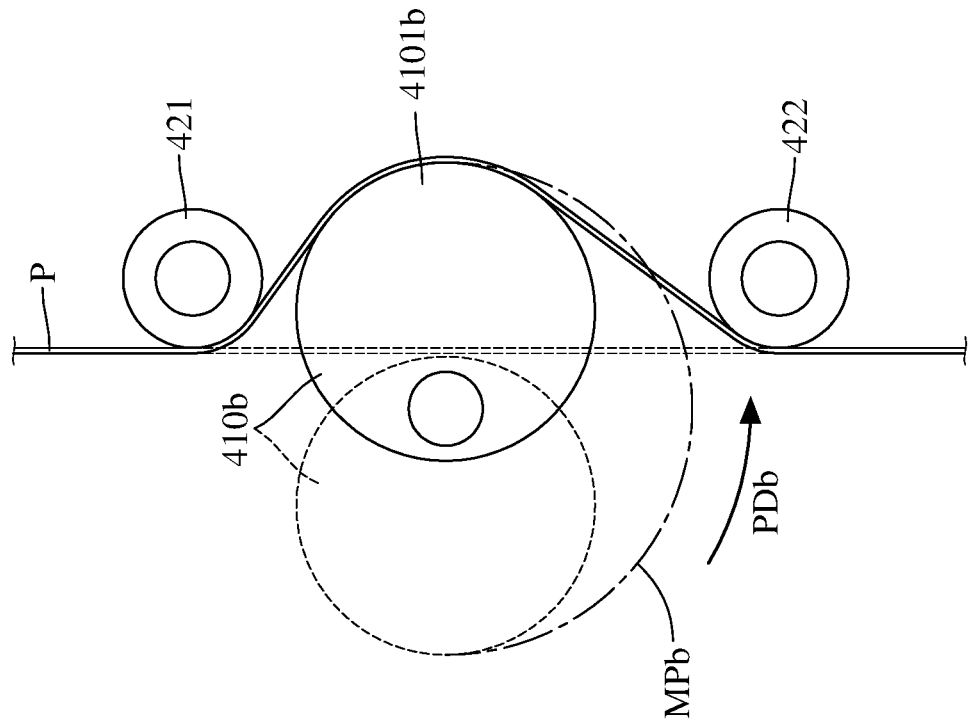
FIG. 8 shows the operation of a travel distance adjustment component according to still another embodiment of the disclosure.

Alternatively, referring to FIG. 8, where FIG. 8 shows the operation of a travel distance adjustment component 410b according to still another embodiment of the disclosure. In FIG. 8, the travel distance adjustment component 410b is an eccentric roller, but the disclosure is not limited to how to fix the travel distance adjustment component 410b in position. The travel distance adjustment component 410b has a tape pushing portion 4101b movable along a movement path MPb. The movement path MPb is a curved path. When the travel distance adjustment component 410b is pivoted in a tape-pushing direction PDb, the tape pushing portion 4101b is moved along the movement path MPb to push and deform the prepreg tape P so as to increase the travel distance of the prepreg tape P.

Figure 9:
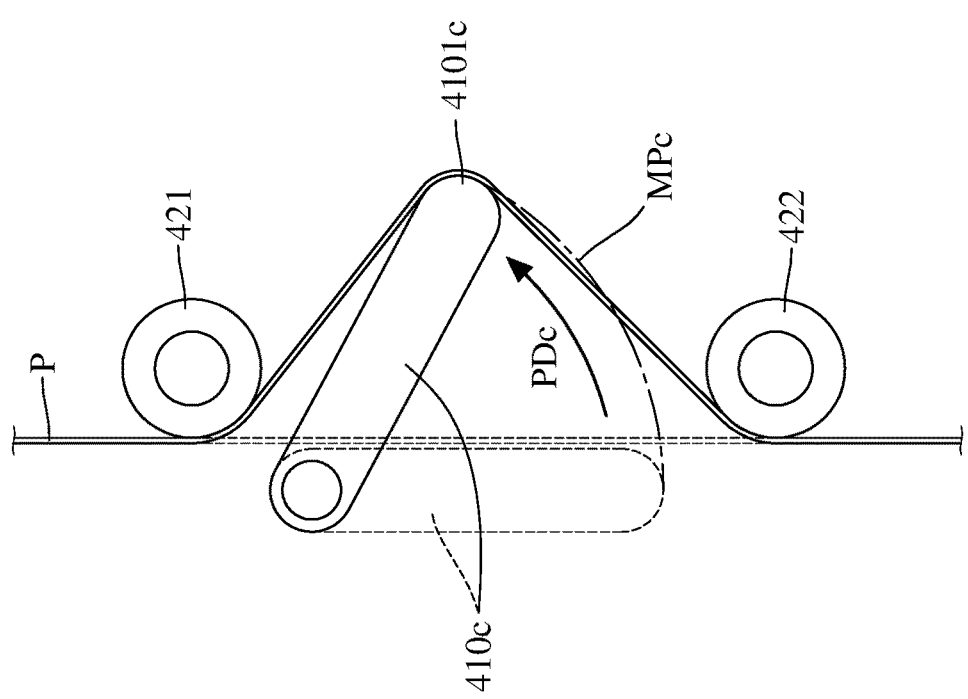
FIG. 9 shows the operation of a travel distance adjustment component according to yet still another embodiment of the disclosure.

Alternatively, referring to FIG. 9, where shows the operation of a travel distance adjustment component 410c according to yet still another embodiment of the disclosure. In FIG. 9, the travel distance adjustment component 410c is a bar or rod-like object being pivotally connected in position at one end. The travel distance adjustment component 410c has a tape pushing portion 4101c at the other end of the travel distance adjustment component 410c, and the tape pushing portion 4101c is movable in a movement path MPc which is a curved path. When the travel distance adjustment component 410c is pivoted in a tape-pushing direction PDc, the tape pushing portion 4101c is moved along the movement path MPc to push and deform the prepreg tape P so as to increase the travel distance of the prepreg tape P.

Figure 10:
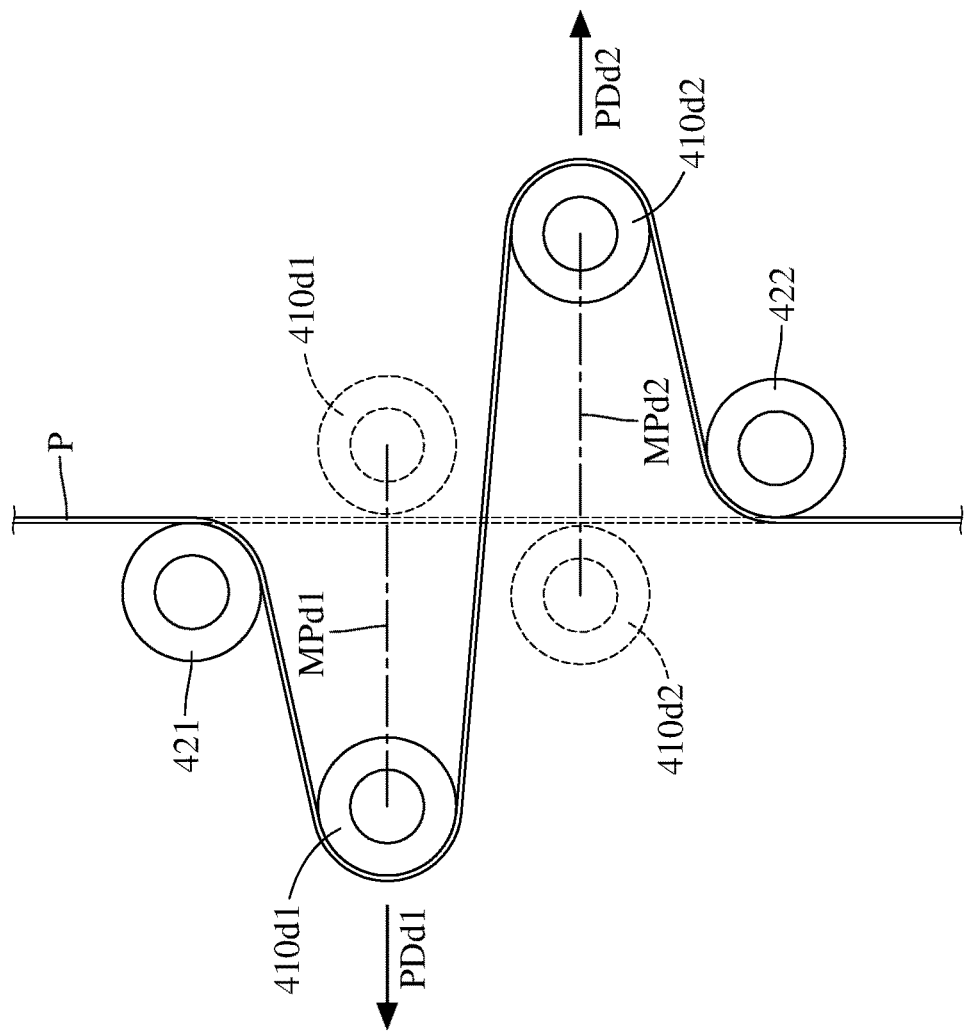
FIG. 10 shows the operation of a travel distance adjustment component according to further still another embodiment of the disclosure.

Alternatively, referring to FIG. 10, this embodiment provides two travel distance adjustment components 410d1 and 410d2. The travel distance adjustment component 410d1 is movable along a movement path MPd1, the travel distance adjustment component 410d2 is movable along a movement path MPd2, and the movement path MPd1 and the movement path MPd2 are two separated straight path substantially parallel to each other. The travel distance adjustment components 410d1 and 410d2 can be installed and driven in a manner the same or similar to that of the previous embodiments, and the disclosure is not limited thereto. During the operation, the travel distance adjustment component 410d1 is moved in a tape-pushing direction PDd1, and the travel distance adjustment component 410d2 is moved in a tape-pushing direction PDd2 opposite to the tape-pushing direction PDd1; that is, the travel distance adjustment component 410d1 and the travel distance adjustment component 410d2 are moved in opposite directions so as to push and deform different parts of the prepreg tape P toward opposite directions and thus further increasing the travel distance of the prepreg tape P.

Figure 11:
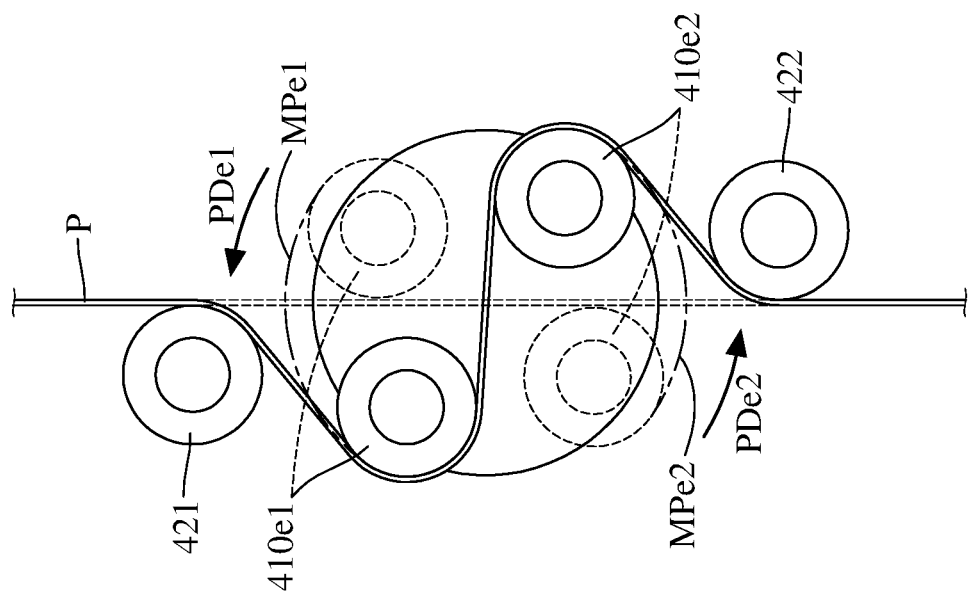
FIG. 11 shows the operation of a travel distance adjustment component according to further yet still another embodiment of the disclosure.

Alternatively, referring to FIG. 11, this embodiment provides two travel distance adjustment components 410e1 and 410e2. The travel distance adjustment component 410e1 is movable along a movement path MPe1, the travel distance adjustment component 410e2 is movable along a movement path MPe2, and the movement path MPe1 and the movement path MPe2 are curved paths. During the operation, the travel distance adjustment component 410e1 is moved in a tape-pushing direction PDe1, and the travel distance adjustment component 410e2 is moved in a tape-pushing direction PDe2 opposite to the tape-pushing direction PDe1; that is, the travel distance adjustment component 410e1 and the travel distance adjustment component 410e2 are moved in opposite directions so as to push and deform different parts of the prepreg tape P toward opposite directions and thus further increasing the travel distance of the prepreg tape P. In addition, in this embodiment, the travel distance adjustment component 410e1 and the travel distance adjustment component 410e2 is disposed on, for example, a rotatable disk (not labeled), such that the movement of the disk can bring the travel distance adjustment component 410e1 and the travel distance adjustment component 410e2 to move in opposite directions, but the disclosure is not limited thereto. In some embodiments, the travel distance adjustment component 410e1 and the travel distance adjustment component 410e2 may be respectively disposed on different driving components.

Note that the travel distance adjustment component of any one of the previous embodiments can be further modified according to actual requirements, and the disclosure is not particularly restricted thereto.

According to the tape laying apparatus as discussed above, since the travel distance adjustment component is movably between the cutting path of the cutting tool and the compaction head and is able to push and deform the part of the prepreg tape passing through the cutting path, the travel distance of the prepreg tape between the cutting path and the compaction head can be increased or decreased with the movement of the travel distance adjustment component. Therefore, prior to the feeding of the cutting tool, the travel distance adjustment component is able to increase the distance that the prepreg tape travels from the cutting path to the compaction head by pushing and deforming the prepreg tape between the cutting path and the compaction head, then, during the feeding of the cutting tool, the travel distance adjustment component is able to release the increased length of the prepreg tape between the cutting path and the compaction head to the compaction head by decreasing the amount it deforms the prepreg tape, such that the feeding of the cutting tool does not affect the tape laying process of the prepreg tape. As such, the increased travel distance of the prepreg tape from the cutting path to the compaction head can be taken as a compensation during the feeding of the cutting tool, so there is no need to pause the feeding of the prepreg tape for waiting for the feeding of the cutting tool. Accordingly, the problems that the conventional tape laying apparatus overheats the prepreg tape due to short pause of the prepreg tape is avoided, such that other serious issues caused by overheating the prepreg tape are avoided as well.

In addition, in some embodiments, the movement path of the travel distance adjustment component can be straight or curved according to actual requirements, having flexibility in design. In some other embodiments, the tape laying apparatus may employ more than two travel distance adjustment components to create a longer travel distance of the prepreg tape between the cutting path and the compaction head.

Further, in some embodiments, the travel distance adjustment component may have the first guide component and the second guide component at opposite side of the movement path of the travel distance adjustment component for guiding the prepreg tape.

Furthermore, in some embodiments, the tape laying apparatus may have a load gauge disposed on a side of the travel distance adjustment component for measuring the force that the travel distance adjustment component pushes the prepreg tape, and the measurement result would be taken as a reference for controlling the position of the travel distance adjustment component, thereby preventing the travel distance adjustment component from making the prepreg tape too tight or too loose.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A composite tape laying apparatus, configured to lay a prepreg tape of a composite tape onto a mould surface, the tape laying apparatus comprising:
    a tape supply spool, configured for the composite tape to be wound thereon;
    a compaction head, configured for delivering the prepreg tape to the mould surface from the tape supply spool;
    a cutting tool, movable along a cutting path, wherein the cutting tool is configured to cut the prepreg tape passing through the cutting path;
    a motor-driven roller and an idler roller, being provided upstream of the cutting tool, wherein the motor-driven roller is configured to move the prepreg tape towards the cutting tool and force the idler roller to rotate and to remove a backing layer of the composite tape from the prepreg tape;
    at least one travel distance adjustment component, movably located between the cutting path and the compaction head; and
    a heating device, being provided downstream of the at least one travel distance adjustment component and configured to heat the prepreg tape;
    wherein the at least one travel distance adjustment component is moved in response to the feeding of the cutting tool and configured to push the prepreg tape passing through the cutting path so as to increase or decrease a travel distance of the prepreg tape downstream of the cutting tool and upstream of the heating device.

2. The composite tape laying apparatus according to claim 1, wherein the at least one travel distance adjustment component is movable along a movement path located between the cutting path and the compaction head.

3. The composite tape laying apparatus according to claim 2, wherein the movement path of the at least one travel distance adjustment component is a straight path.

4. The composite tape laying apparatus according to claim 3, wherein a quantity of the at least one travel distance adjustment component is two, and the travel distance adjustment components have opposite tape-pushing directions.

5. The composite tape laying apparatus according to claim 2, wherein a quantity of the at least one travel distance adjustment component is two, the movement paths of the two travel distance adjustment components are curved paths, and the two travel distance adjustment components have opposite tape-pushing directions.

6. The composite tape laying apparatus according to claim 1, wherein the at least one travel distance adjustment component is an eccentric roller, the at least one travel distance adjustment component is movable between the cutting path and the compaction head, the at least one travel distance adjustment component has a tape pushing portion, and the tape pushing portion is movable along a curved movement path between the cutting path and the compaction head.

7. The composite tape laying apparatus according to claim 1, wherein the at least one travel distance adjustment component is a bar-like object, one end of the at least one travel distance adjustment component is pivotally fixed in position between the cutting path and the compaction head, the at least one travel distance adjustment component has a tape pushing portion located at another end of the at least one travel distance adjustment component, and the tape pushing portion is movable along a curved movement path between the cutting path and the compaction head.

8. The composite tape laying apparatus according to claim 1, further comprising a first guide component and a second guide component, wherein the first guide component and the second guide component are located between the cutting path and the compaction head, and the at least one travel distance adjustment component is movable along a movement path which is located between the first guide component and the second guide component.

9. The composite tape laying apparatus according to claim 8, wherein the at least one travel distance adjustment component is movable along the movement path, and the movement path is not parallel to a line passing through the first guide component and the second guide component.

10. The composite tape laying apparatus according to claim 1, further comprising a load gauge disposed on a side of the at least one travel distance adjustment component opposite to the prepreg tape.

* * * * *